United States Patent
Yoshino

(10) Patent No.: US 11,271,661 B2
(45) Date of Patent: Mar. 8, 2022

(54) DRIVE-TIMING ADJUSTMENT METHOD AND DEVICE FOR A PHOTON DETECTOR, AND OPTICAL COMMUNICATION SYSTEM

(71) Applicant: NEC Corporation, Tokyo (JP)

(72) Inventor: Ken-ichiro Yoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/978,579

(22) PCT Filed: Mar. 19, 2018

(86) PCT No.: PCT/JP2018/010775
§ 371 (c)(1),
(2) Date: Sep. 4, 2020

(87) PCT Pub. No.: WO2019/180770
PCT Pub. Date: Sep. 26, 2019

(65) Prior Publication Data
US 2021/0021352 A1    Jan. 21, 2021

(51) Int. Cl.
*H04B 10/70* (2013.01)
*H04B 10/556* (2013.01)
(Continued)

(52) U.S. Cl.
CPC .......... *H04B 10/70* (2013.01); *H04B 10/556* (2013.01); *H04B 10/61* (2013.01); *H04L 7/0075* (2013.01); *H04L 9/0819* (2013.01); *H04L 9/0852* (2013.01)

(58) Field of Classification Search
CPC ...... H04B 10/556; H04B 10/61; H04B 10/70; H04L 7/0075; H04L 9/0819; H04L 9/0852; H04L 9/0858
(Continued)

(56) References Cited

U.S. PATENT DOCUMENTS 7,555,127 B2 *  6/2009  Nambu ................. H04L 9/0852
                                              380/256
8,009,984 B2 *  8/2011  Maeda ................. H04L 9/0852
                                              398/38
(Continued)

FOREIGN PATENT DOCUMENTS

JP    2006-513678 A    4/2006
JP    2007-124484 A    5/2007
(Continued)

OTHER PUBLICATIONS

Eckstein et al ;A quantum pulse gate based on spectrally engineered sum frequency generation; Jul. 2011; Optical Society of America, vol. 19, No. 15/Optical Express 13770; pp. 1-9. (Year: 2011).*

(Continued)

*Primary Examiner* — Amritbir K Sandhu

(57) ABSTRACT

[Problem] A method, a device, a system and a program that can adjust the drive timing of a photon detector with high speed and high reliability is provided. [Solution] A timing adjustment device for adjusting timing for driving a photon detector (202) of a receiver (200), includes: an asymmetric interferometer (201) that inputs an optical pulse sequence from a sender (100) and outputs an interference output optical pulse to the photon detector (202), wherein the optical pulse sequence includes two consecutive pulses, the sender subjecting the two consecutive pulses to phase-modulation according to send data fixed to a predetermined bit value, wherein the interference output optical pulse is generated by the two consecutive pulses interfering with each other depending on a phase difference, and wherein the interference output optical pulse is output to the photon detector corresponding to the phase difference; and a controller (204) configured to: record photon counts of photons detected by the photon detector while shifting gate application timing for the photon detector over a predetermined (Continued)

FIRST EXEMPLARY EMBODIMENT range; and set gate application timing for the photon detector with reference to a timing indicating a peak value of the photon counts.

14 Claims, 10 Drawing Sheets

(51) Int. Cl.
*H04B 10/61* (2013.01)
*H04L 7/00* (2006.01)
*H04L 9/08* (2006.01)

(58) Field of Classification Search
USPC .................................................. 398/154–156
See application file for complete search history.

(56) References Cited

U.S. PATENT DOCUMENTS

| | | | | |
|---|---|---|---|---|
| 8,184,989 B2* | 5/2012 | Maeda | .................. | H04L 9/0852 398/188 |
| 8,718,485 B2* | 5/2014 | Tanaka | .................. | H04L 9/0858 398/185 |
| 8,949,300 B2* | 2/2015 | Tanaka | .................. | H04L 9/0838 708/255 |
| 9,584,319 B2* | 2/2017 | Yoshino | ................. | H04B 10/70 |
| 10,862,593 B2* | 12/2020 | Hosokawa | ............. | H04B 10/11 |
| 2006/0018475 A1* | 1/2006 | Vig | ....................... | H04L 9/0852 380/256 |
| 2006/0280509 A1* | 12/2006 | Tomaru | ................. | H04L 9/0858 398/188 |
| 2007/0116286 A1* | 5/2007 | Yuan | ..................... | H04L 9/0858 380/256 |
| 2008/0144823 A1* | 6/2008 | Abe | ........................ | H04J 14/02 380/256 |
| 2014/0177837 A1* | 6/2014 | Zubairy | ................. | H04B 10/70 380/256 |
| 2015/0076361 A1* | 3/2015 | Bienfang | .............. | H01L 31/107 250/395 |
| 2015/0304106 A1* | 10/2015 | Yoshino | ................. | H04B 10/70 250/204 |
| 2015/0369657 A1* | 12/2015 | Yoshino | ................. | G01J 1/4228 250/204 |
| 2015/0372768 A1* | 12/2015 | Dynes | .................... | H04B 10/70 398/188 |
| 2016/0018475 A1* | 1/2016 | Mozs | ..................... | G01R 33/06 324/202 |
| 2017/0099139 A1* | 4/2017 | Han | ....................... | H04L 9/0852 |

FOREIGN PATENT DOCUMENTS

| | | |
|---|---|---|
| JP | 2007-526721 A | 9/2007 |
| JP | 2008-538678 A | 10/2008 |
| JP | 4663651 B | 4/2011 |
| JP | 2011-188043 A | 9/2011 |
| JP | 2016-54365 A | 4/2016 |
| JP | 2016-163079 A | 9/2016 |

OTHER PUBLICATIONS

Eckstein et al; A quantum pulse gate based on spectrally engineered sum frequency generation; Jul. 2011; Optical Society of America; pp. 1-9. (Year: 2011).*

International Search Report dated Jun. 19, 2018, in corresponding PCT International Application.

* cited by examiner

DRIVE-TIMING ADJUSTMENT METHOD AND DEVICE FOR A PHOTON DETECTOR, AND OPTICAL COMMUNICATION SYSTEM

CROSS-REFERENCE TO RELATED PATENT APPLICATIONS

This application is a National Stage Entry of International Application No. PCT/JP2018/010775, filed Mar. 19, 2018. The entire contents of the above-referenced application is expressly incorporated herein by reference.

TECHNICAL FIELD

The present invention relates to an optical communication device in an optical communication system, and more particularly to techniques for adjusting the drive timing of a photon detector capable of detecting a single photon.

BACKGROUND ART

In the field of optical communication, Quantum Key Distribution (QKD) has been actively researched and developed in recent years as a means of achieving high confidentiality of a transmission line. A QKD system, which uses a photon as a communication medium, requires a device for detecting a single photon. An avalanche photo diode (APD) is used as such a single photon detector. The APD is driven according to a Geiger mode that applies a reverse bias voltage exceeding the breakdown voltage. Further for noise reduction, the APD is driven according to a gated Geiger Mode (GGM) that applies the voltage only at the incident timing of photons. In the GGM driving system, it is necessary to match the gate voltage application timing with the photon incidence timing, thus making a technique for adjusting the gate application timing indispensable. There have been proposed various techniques for adjusting gate application timing.

For instance, Patent Literature 1 discloses a timing adjusting method composed of: searching for the maximum value of photon counts by scanning gate application timings of the photon detector; and setting the timing at the maximum value of photon counts as the optimum timing. Further, Patent Literature 2 discloses a method in which by similarly scanning the gate application timings to set the optimum timing at which the bit error rate (BER) is minimized.

BACKGROUND-ART LITERATURE

Patent Literature

[Patent Literature 1] JP Patent Number 4663651
[Patent Literature 2] JP Publication Number 2008-538678

SUMMARY OF INVENTION

Problems to be Solved by Invention

However, the above-described method using the maximum value of the photon counts is likely to erroneously set gate application timing because unwanted pulses, when mixed in optical pulses incident on the photon detector, are counted, thereby erroneously recognizing this photon count as the maximum value for setting gate application timing. Hereinafter, the main cause of such erroneous setting will be briefly described with reference to the drawing.

As illustrated in FIG. 1, an optical communication system is assumed where an asymmetric interferometer A having a delay time a is provided on the sending side and an asymmetric interferometer B having a delay time b is provided on the receiving side. An asymmetric interferometer uses its optical path difference to generate a pulse delayed by the predetermined delay time and couples the incident pulse and the delayed pulse to generate a double pulse comprised of two consecutive pulses a predetermined delay time apart.

The interferometer A on the sending side inputs optical pulses with a predetermined period (1 CLK) and couples the optical pulses with pulses obtained by delaying the optical pulses by time a to output a first double pulse comprised of two consecutive pulses the delay time a apart. The interferometer B on the receiving side inputs the first double pulse and couples the first double pulse with a second double pulse obtained by delaying the first double pulse by the delay time b to output a received pulse sequence. When the system is used at the maximum pulse repetition frequency, the delay times a and b are set to the same delay time of CLK/2. Accordingly, in the interferometer B on the receiving side, as shown in FIG. 1, the following pulse of each first double pulse coincides with the preceding pulse of each second double pulse, and the preceding pulse of each first double pulse coincides with the following pulse of each second double pulse.

In the QKD system, the sending side modulates the first double pulse according to a phase difference between the preceding and following pulses of the first double pulse. Accordingly, the coupled light of the following pulse of the first double pulse and the preceding pulse of the second double pulse is a pulse necessary for timing adjustment and information acquisition (hereinafter referred to as a main pulse). The coupled light of the preceding pulse of the first double pulse and the following pulse of the second double pulse is an unnecessary pulse (hereinafter, referred to as a satellite pulse). In other words, the main pulse is located at the center of three consecutive pulses of the received pulse sequence, and unnecessary satellite pulses on both sides of the main pulse. The timing adjustment must be made using only the main pulses.

However, since either of the main and satellite pulses is produced by coupling two pulses, they have no significant difference in photon count number. Accordingly, the above-described method of monitoring photon counts cannot distinguish the main pulse from satellite pulse, resulting in a 50% probability that the timing will be erroneously adjusted according to the satellite pulse.

On the other hand, the above-described method of setting an optimal timing at the timing minimizing a bit error rate (BER) can correctly select the main pulse because the BER of the satellite pulse becomes higher. However, to evaluate the BER with high accuracy, about 100 times more data points are needed than when monitoring photon counts. Accordingly, the method using the BER has a drawback that the measurement time and the amount of calculation are increased and it takes more time to find the optimum timing, compared to the method using the photon count value.

An object of the present invention is to provide a method, a device, a system, and a program that can adjust the drive timing of a photon detector with high speed and high reliability.

Means to Solve Problems

A timing adjustment device according to a first aspect of the present invention is a timing adjustment device for adjusting drive-timing for a photon detector of a receiver in an optical communication system in which information is transmitted from a sender to the receiver by phase-modulation on photon pulses according to the information, the timing adjustment device including; an asymmetric interferometer that inputs an optical pulse sequence from the sender and outputs an interference output optical pulse to the photon detector, wherein the optical pulse sequence includes two consecutive pulses, the sender subjecting the two consecutive pulses to phase-modulation according to send data fixed to a predetermined bit value, wherein the interference output optical pulse is generated by the two consecutive pulses interfering with each other depending on a phase difference, and wherein the interference output optical pulse is output to the photon detector corresponding to the phase difference; and a controller configured to: record photon counts of photons detected by the photon detector while shifting gate application timing for the photon detector over a predetermined range; and set gate application timing for the photon detector with reference to a timing indicating a peak value of the photon counts.

A timing adjustment method according to a second aspect of the present invention is a timing adjustment method for adjusting drive-timing of a receiver in an optical communication system in which information is transmitted from a sender to the receiver by phase-modulation on photon pulses according to the information, the method including: at the sender, sending an optical pulse sequence comprising two consecutive pulses subjected to phase-modulation according to send data fixed to a predetermined bit value; at the receiver, by an asymmetric interferometer, outputting an interference output optical pulse to the photon detector, wherein the interference output optical pulse is generated by the two consecutive pulses interfering with each other depending on a phase difference, and wherein the interference output optical pulse is output to the photon detector corresponding to the phase difference; and by a controller, recording photon counts of photons detected by the photon detector while shifting gate application timing for the photon detector over a predetermined range, and setting gate application timing for the photon detector with reference to a timing indicating a peak value of the photon counts.

An optical communication system according to a third aspect of the present invention is an optical communication system in which a sender and a receiver are connected through an optical transmission line, the sender comprising: a light source that generates pulses having a predetermined period; a first asymmetric interferometer having a predetermined delay time; and a phase modulator that performs phase-modulation on two consecutive pulses of a double pulse inputted from the first asymmetric interferometer according to send data fixed to a predetermined bit value, the receiver comprising: a plurality of photon detectors each corresponding to bit values of the send data; a second asymmetric interferometer having the predetermined delay time, wherein the second asymmetric interferometer receives a double pulse from the sender and outputs an interference output optical pulse to a photon detector, wherein the interference output optical pulse is generated by two consecutive pulses of the received double pulse interfering with each other depending on a phase difference, and wherein the interference output optical pulse is output to the photon detector corresponding to the phase difference; and a controller configured to: record photon counts of photons detected by the photon detector while shifting gate application timing for the photon detector over a predetermined range; and set gate application timing for the photon detector with reference to a timing indicating a peak value of the photon counts.

A program according to a fourth aspect of the present invention is a program functioning a computer as an adjustment device for adjusting drive timing of a photon detector of a receiver in an optical communication system in which information is transmitted from a sender to the receiver by phase-modulation on photon pulses according to the information, the adjustment device comprising an asymmetric interferometer that receives an optical pulse sequence from the sender and outputs an interference output optical pulse to the photon detector, wherein the optical pulse sequence includes two consecutive pulses, the sender subjecting the two consecutive pulses to phase-modulation according to send data fixed to a predetermined bit value, wherein the interference output optical pulse is generated by the two consecutive pulses interfering with each other depending on a phase difference, and wherein the interference output optical pulse is output to the photon detector corresponding to the phase difference, the program comprising: a first function of recording photon counts of photons detected by the photon detector while shifting gate application timing for the photon detector over a predetermined range; and a second function of setting gate application timing for the photon detector with reference to a timing indicating a peak value of the photon counts.

Effects of Invention

As described above, according to the present invention, the drive timing of a photon detector can be performed with high speed and high reliability.

OUTLINE OF EXEMPLARY EMBODIMENTS

According to an exemplary embodiment of the present invention, a sender generates a double pulse from an optical pulse having a clock period CLK through an asymmetric interferometer, and performs phase-modulation on the double pulse with fixing a bit value of send data to "0" (or "1"). The receiver outputs the interference output of the received double pulse through an asymmetric interferometer to the photon detector corresponding to the fixed bit value, and sets the drive timing of the photon detector based on the peak timing of the photon count.

For example, assuming the fixed bit value being "0" (or "1"), the gate applied to a photon detector for detecting "0" (or "1") is set such that the peak timing of photon count can be detected by the photon detector. Alternatively, the gate applied to a photon detector for detecting "1" (or "0") is set such that a photon can be detected at the timing deviated by CLK/2 from the peak timing of the photon count.

In this way, the send data fixed to a predetermined bit value allows the drive timing of the photon detector to be correctly set only by detecting the peak of photon count, resulting in high-speed and highly reliable drive-timing adjustment.

Hereinafter, exemplary embodiments and examples of the present invention will be described in detail with reference to the drawings, taking a one-way interferometer system as an example.

1. Exemplary Embodiment 1.1) System Configuration

Figure 1:
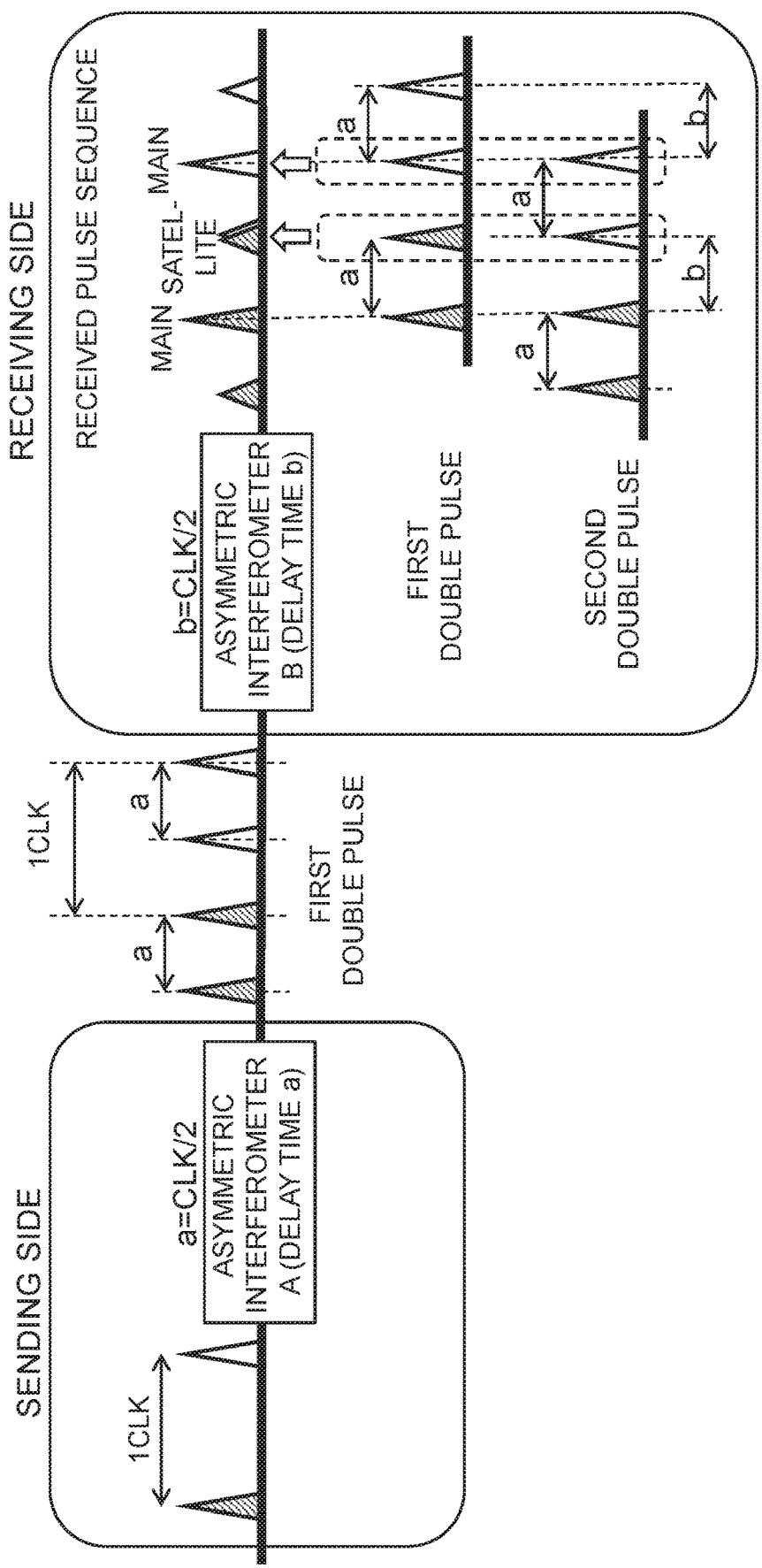
FIG. 1 is an operation describing diagram showing a process of generating a received pulse sequence in an optical communication system using asymmetric interferometers.
Figure 2:
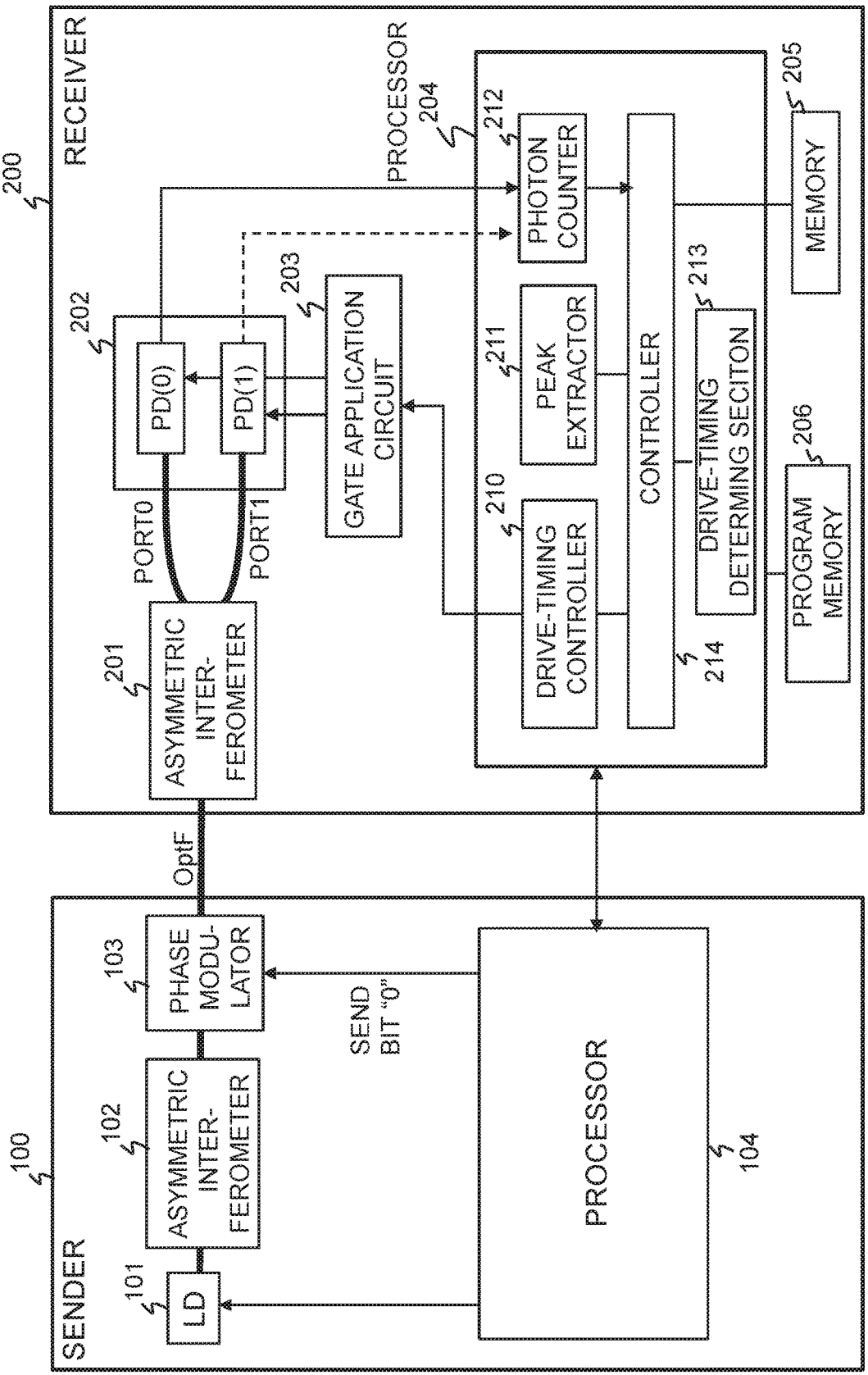
FIG. 2 is a block diagram of an optical communication system for explaining the schematic configuration of a drive-timing adjustment device according to an exemplary embodiment of the present invention.

In FIG. 2, it is assumed that the sender 100 and the receiver 200, which are optical communication devices, are connected by an optical transmission line. The sender 100 is provided with a light emitting device 101, an asymmetric interferometer 102, a phase modulator 103, and a processor 104.

The asymmetric interferometer 102 generates a double pulse comprised of two consecutive pulses a predetermined delay time Δt apart for each optical pulse, and outputs it to the phase modulator 103. The phase modulator 103 performs phase-modulation on the double pulse during normal operation such that a phase difference between two consecutive pulses is generated according to a send bit. In the present embodiment, the send bit value is fixed to either "0" or "1" when adjusting the drive timing on the receiving side. The processor 104 controls the optical pulse generation timing of the light emitting device 101 and the send bit value of the phase modulator 103.

The receiver 200 is provided with an asymmetric interferometer 201, a photon detecting unit 202, a gate application circuit 203, a processor 204, a memory 205, and a program memory 206. The asymmetric interferometer 201 has the same delay time as that of the asymmetric interferometer 102 on the sending side to form an interference system in conjunction with that of the sending side. The two consecutive pulses of the double pulse received through the optical transmission path are combined and interfered by the asymmetric interferometer 201. The interference output of the asymmetric interferometer 201 is a high-intensity optical pulse at either the "0" value port PORT0 or the "1" value port PORT1 depending on the phase difference between the two consecutive pulses of the double pulse.

The photon detecting unit 202 includes a photon detector PD(0) for "0" value and a photon detector PD(1) for "1" value. These photon detectors PD(0) and PD(1) are optically connected to the "0" value port PORT0 and the "1" value port PORT1, respectively. Each of the photon detectors PD(0) and PD(1) is an element capable of detecting a single photon, which is typically an avalanche photodiodes (APD). The gate application circuit 203 applies a gate voltage to each of the photon detectors PD(0) and PD(1) at the timing controlled by the processor 204.

The processor 204 executes programs stored in the program memory 206 to set the drive timings of the photon detectors PD(0) and PD(1), respectively. As illustrated in FIG. 2, the following functions are implemented by the processor 204: a drive-timing controller 210, a peak extractor 211, a photon counter 212, a drive-timing determination section 213, and a controller 214. However, it is also possible to implement at least part of these functions of the processor 204 by hardware. Note that the processor 104 of the sender 100 and the processor 204 of the receiver 200 can exchange necessary information mutually on a channel different from a channel for sending the above-described double pulse.

The drive-timing controller 210 controls the gate application timing of the gate application circuit 203 for the photon detectors PD(0) and PD(1) under the control of the controller 214. The photon counter 212 counts the number of photons detected by one of the photon detectors PD(0) and PD(1). The controller 214 records the photon count at the controlled gate application timing in the memory 205. The peak extractor 211 detects the peak of the photon counts recorded in the memory 205, and outputs the gate application timing corresponding to the peak to the drive-timing determination section 213.

In the case of the send bit value fixed to "x" (x is "0" or "1"), the drive-timing determination section 213 determines gate application timing so that the photon detector PD(x) for detecting "x" can detect a photon at the peak timing of photon counts. In the case where the other photon detector PD(y) (y is "0" or "1" and is not equal to x) is used, the drive-timing determination section 213 determines gate application timing so that the photon detector PD(y) can detect a photon at the timing shifted by a predetermined phase amount from the peak timing of photon counts. However, the gate application timings of the photon detectors PD(0) and PD(1) are optimized independently due to the differences in wiring lengths and operation delays of electronic circuits.

1.2) One-Way System of Interferometers

Figure 3:
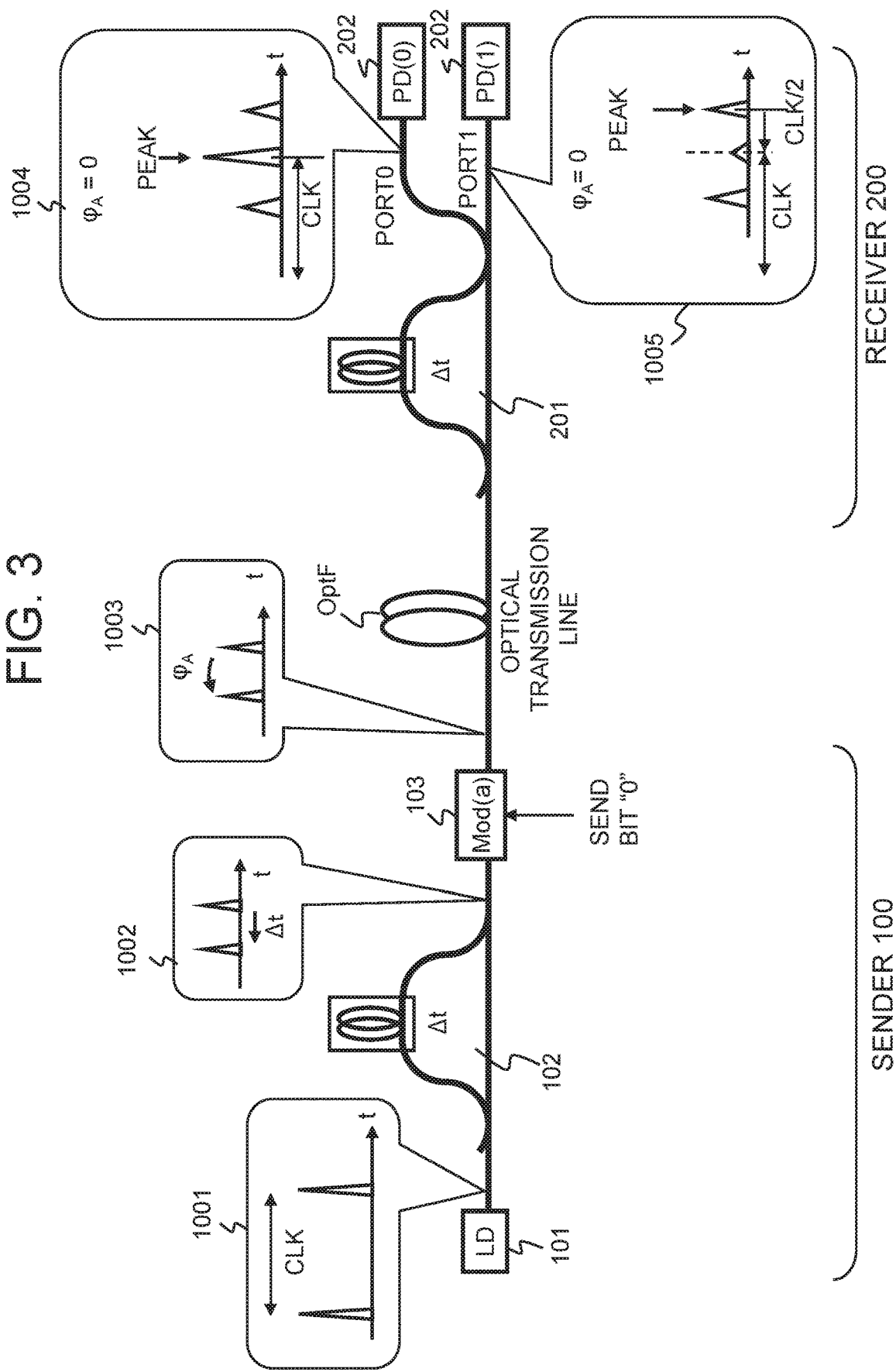
FIG. 3 is a schematic system configuration diagram for explaining a drive-timing setting process in a quantum key distribution (QKD) system which is an example of the optical communication system shown in FIG. 2.

Hereinafter, the interference output pulses for drive-timing adjustment according to the present embodiment will be described with reference to the one-way interferometer system as illustrated in FIG. 3, As illustrated in FIG. 3, the light emitting device 101 of the sender 100 generates a sequence of optical pulses 1001 with a period of the clock CLK. In the system shown in FIG. 3, an optical pulse is a weak light pulse having an intensity of one or less photon per pulse. Such a weak light pulse may be generated by an optical attenuator attenuating an optical pulse output from an ordinary laser diode to one or less photon per pulse.

The asymmetric interferometer 102 is comprised of two optical waveguides having different optical path lengths and transforms a single optical pulse 1001 to a double pulse comprised of two consecutive pulses 1002 having a delay time Δt. The phase modulator 103 performs phase-modulation on the double pulse such that the phase difference $\varphi_A$ corresponding to the send bit "0" is generated between two consecutive pulses, and thereby outputs a doble pulse 1003 to be transmitted. Here, it is assumed that the phase difference $\varphi_A=0$ corresponding to the send bit "0". The modulated double pulse 1003 is transmitted to the receiver 200 through the optical transmission line OptF.

The receiver 200 includes an asymmetric interferometer 201 having the same configuration as the asymmetric interferometer 102 of the sender 100. The two consecutive pulses arrived through the optical transmission line OptF are coupled and interfere with each other through the asymmetric interferometer 201. Due to this interference, a triple pulse 1004 appears at the "0" value port PORT0 and a triple pulse 1005 appears at the "1" value port PORT1 of the asymmetric interferometer 201. In the triple pulse 1004 of the "0" value port PORT0, the light intensity of the main pulse shows a peak in the center of the triple pulse. On the other hand, in the triple pulse 1005 of the "1" value port PORT1, the intensity of the central pulse is low, and the intensity of the satellite pulses before and after the central pulse shows a peak.

When the phase difference $\varphi_A$ is fixed to π corresponding to the send bit "1" in the phase modulator 103 of the sender 100, a triple pulse at the "0" value port PORT0 and a triple pulse at the 1" value port PORT1 are arranged in reverse to the arrangements of pulse intensities as shown in FIG. 3. Specifically, in the triple pulse of the "1" value port PORT1, the light intensity of the main pulse shows a peak in the center, and in the triple pulse of the "0" value port PORT0, the intensity of the central pulse becomes low and the intensity of the satellite pulses before and after the central pulse shows a peak, Next, taking the case of the send bit value being fixed to "0" as an example, let us describe a method of setting the drive timing by detecting the peak values in the triple pulses output to the "0" value port PORT0 and the "1" value port PORT1 of the asymmetric interferometer 201.

1.3) Setting of Drive Timing

By referring to FIG. 4, the setting operation of the drive timing in the receiving side when the send bit is fixed to "0" will be described. As described above, the basic operation is similar to the case of the send bit being fixed to "1".

Figure 4:
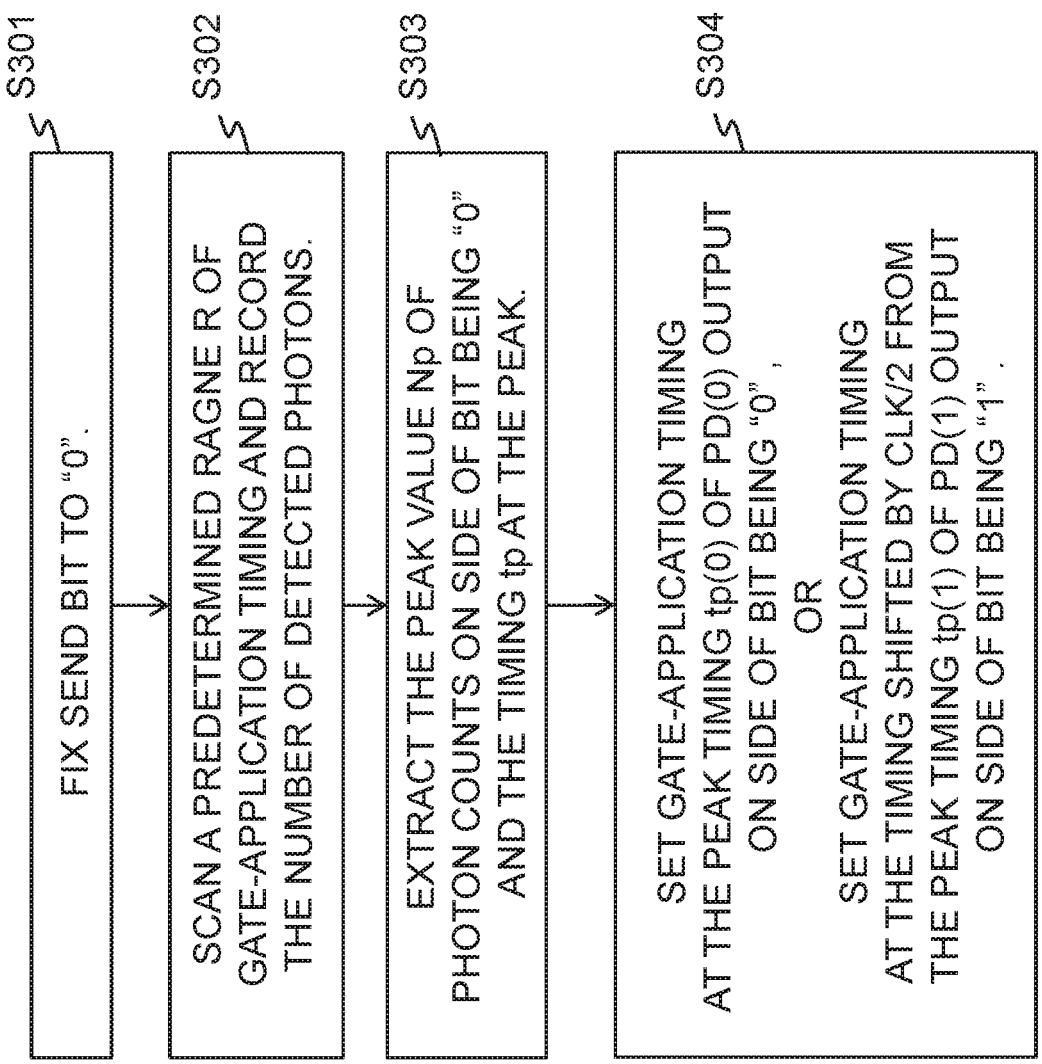
FIG. 4 is a flowchart showing an example of the drive-timing adjustment method according to the present exemplary embodiment.

In FIG. 4, the processor 104 of the sender 100 fixes the send bit value to "0", which causes the phase modulator 103 to provide a phase difference $\varphi_A=0$ between the two consecutive pulses of the double pulse generated by the asymmetric interferometer 102 (Operation S301).

When the receiver 200 receives the double pulse, the triple pulse 1004 appears on the "0" value port PORT0 of the asymmetric interferometer 201 and the triple pulse 1005 appears on the "1" value port PORT1 as shown in FIG. 3. Here, it is assumed that the photon detector PD(0) detects the triple pulse 1004 on the "0" value port PORT0 and is the photon counter 212 counts the number of the detected photons.

The controller 214 controls the drive-timing controller 210, the peak extractor 211 and the drive-timing determination section 213, and determines the drive timing as follows. First, the drive-timing controller 210 scans a predetermined scan range R of the gate application timing through the gate application circuit 203. The controller 214 records the number of photons detected by the photon detector PD(0) in the memory 205 at each timing within the scan range R (Operation S302). The operation S302 will be described in detail with reference to FIGS. 5 and 6. Subsequently, the peak extractor 211 extracts the peak value Np(0) of the photon counts and the timing tp(0) at that time from the data recorded in the memory 205 (Operation S303). The drive-timing determination section 213 determines the gate application timing for driving the photon detectors PD(0) and PD(1) based on the peak timing tp(0) of the photon counts (Operation S304).

1.4) Recording Photon Counts Through Scanning

The recording operation of the photon counts through scanning of the gate application timing will be described with reference to FIGS. 5 and 6.

Figure 5:
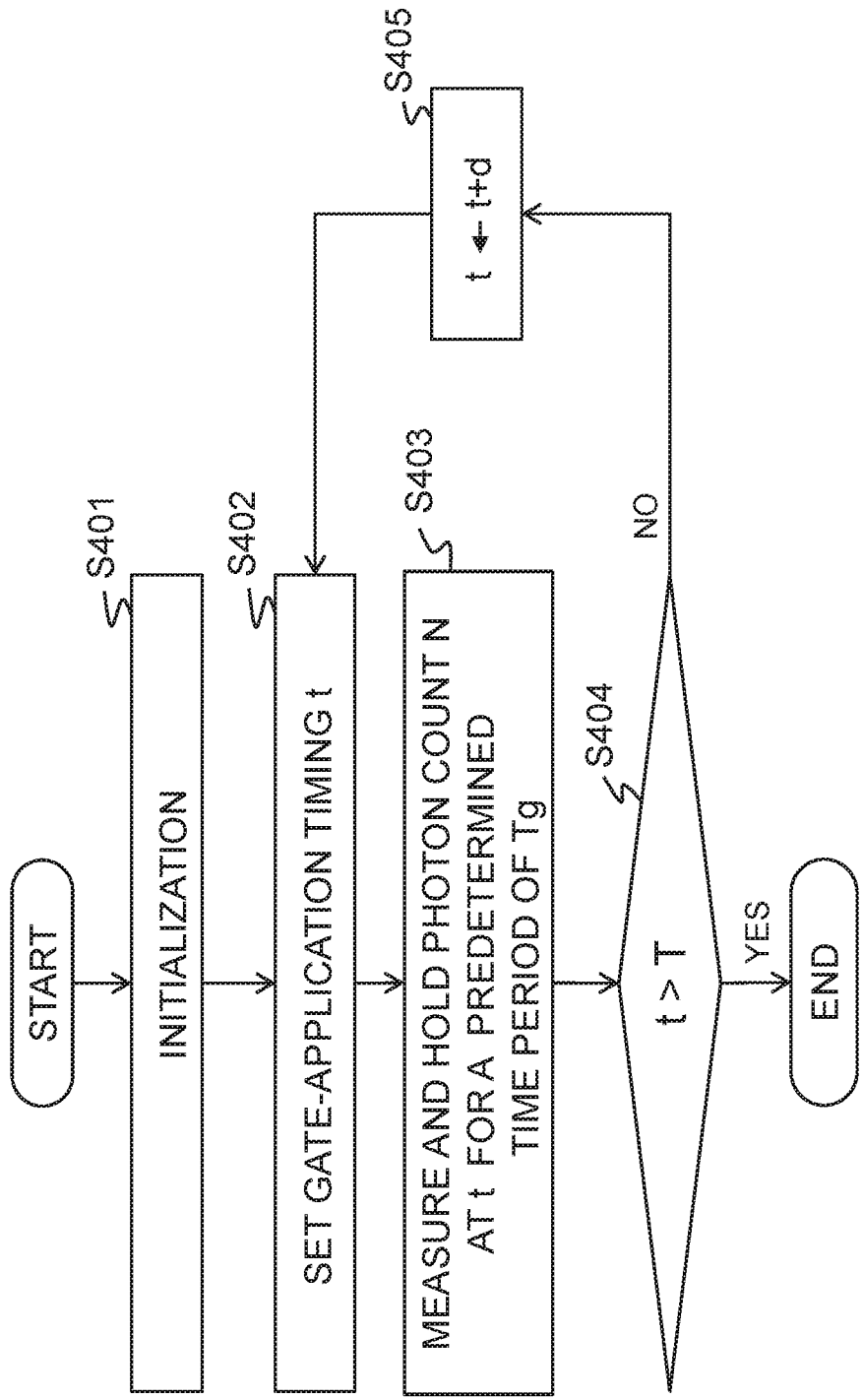
FIG. 5 is a flowchart showing an example of a procedure for measuring photon counts by scanning the gate application timings in the receiver as shown in FIG. 2.
Figure 6:
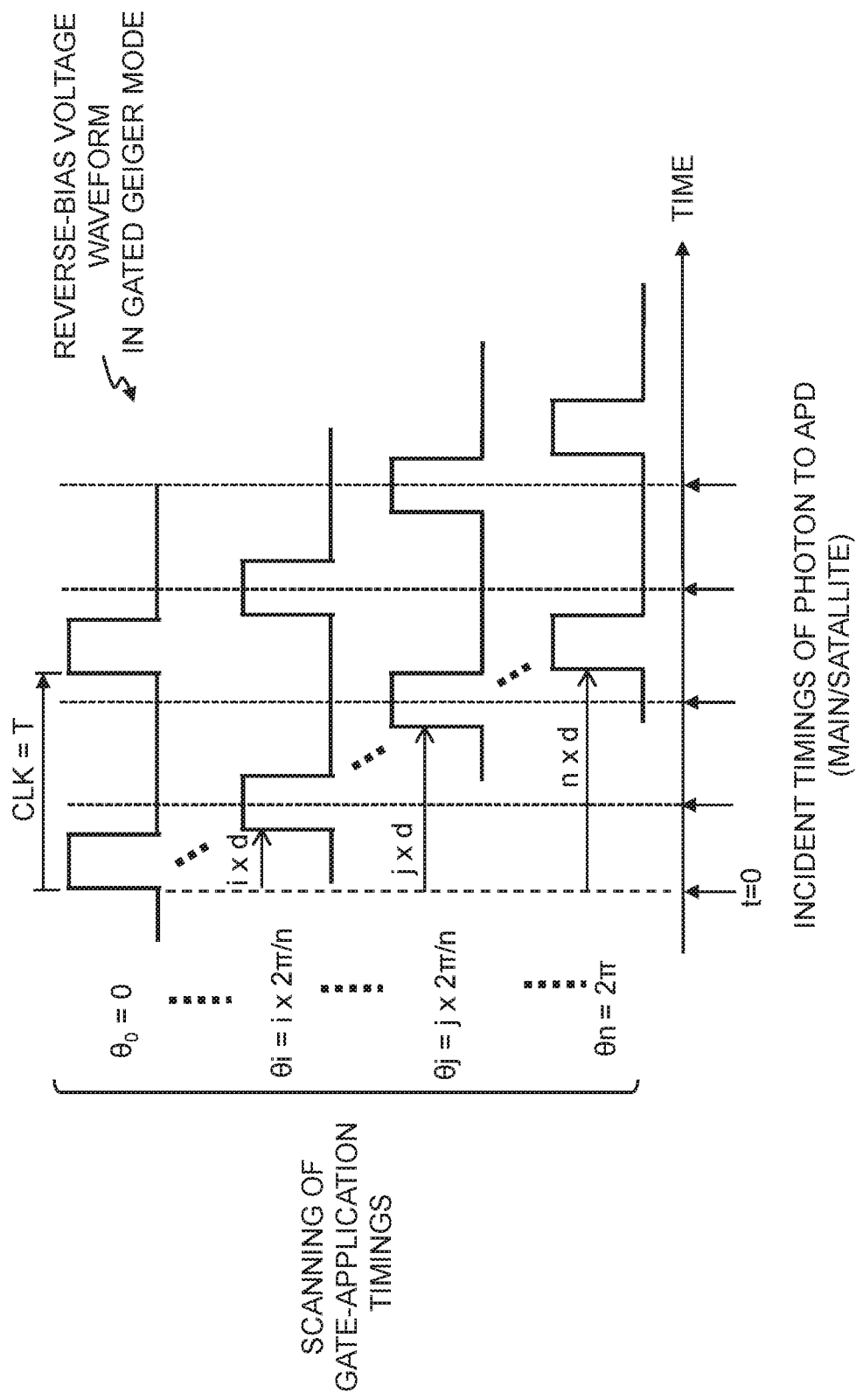
FIG. 6 is a timing chart showing an example of scanning of gate application timings in the receiver as shown in FIG. 2.

Referring to FIG. 5, the controller 214 initializes variables t, N, δ and the like used in the timing adjustment method (Operation S401), and then sets the gate application timing tin the drive-timing controller 210 (Operation S402). The drive-timing controller 210 applies repetitive gate voltages at intervals of CLK=T for a predetermined period Tg to the photon detecting unit 202 through the gate application circuit 203, as shown in the phase $\theta_0=0$ of FIG. 6. For instance, the period CLK is set at T=800 ps (picoseconds) and a period of measurement time Tg is set at one (1) second. The controller 214 inputs the photon count N during the predetermined period Tg from the photon counter 212, records the count N in association with the gate application timing t in the memory 205 (Operation S403).

When the gate application timing t has not reached the period CLK=T (NO in Operation S404), the controller 214 increases the gate application timing t by a predetermined time period d (Operation S405). In other words, the phase of the gate application timing t is shifted by one (1) step d=2π/n and the shifted gate application timing is set in the drive-timing controller 210 (Operation S402), which then repeats the operations S402 to S405 until t>T is satisfied. Accordingly, T is the scan range R, and the shift step d is T/n. As shown by the phases $\theta_0=0$ to 2π in FIG. 6, the drive-timing controller 210 applies the repeated gate voltage with the period CLK to the photon detecting unit 202 through the gate application circuit 203 while shifting the phase in steps of d. As a result, the number of photons N at each gate application timing t is counted and recorded in the memory 205. As an example, assuming the scan range T=800 ps, when the step d is 25 ps, n is 32.

In this way, the gate application timings are scanned to record the photon counts of the triple pulse 1004 at the "0" value port PORT0 and the triple pulse 1005 at the "1" value port PORT1. In the present embodiment, examples of changes in the number of photon counts depending on the gate application timing are shown in FIGS. 7 and 8.

Figure 7:
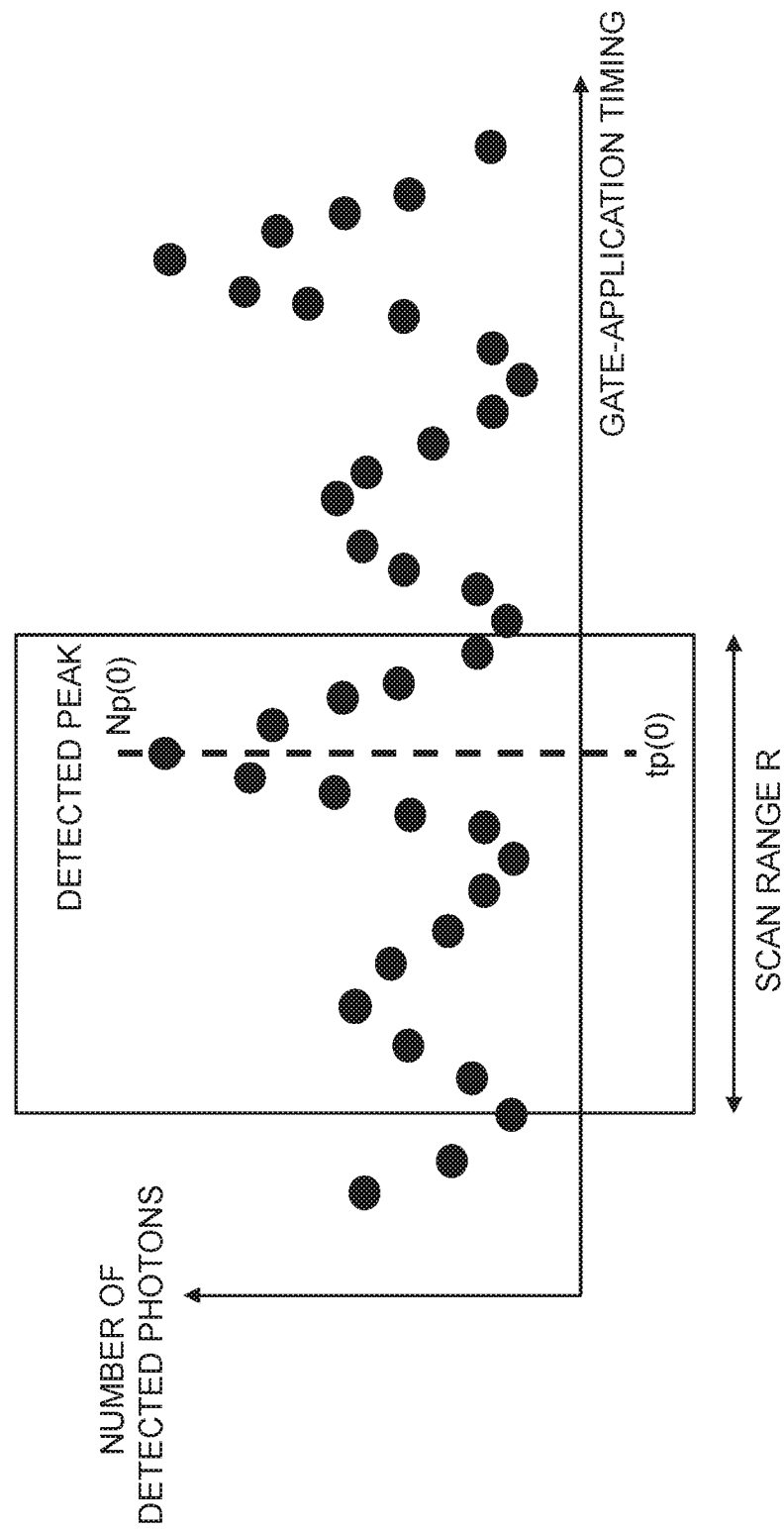
FIG. 7 is a graph showing a change in photon count detected by the photon detector PD on the side of bit value being 0, which is obtained by scanning the gate application timings for the photon detector PD in FIG. 2.

As illustrated in FIG. 7, when scanning the scan range R of the gate application timing corresponding to the clock period CLK, the number of photon counts at the photon detector PD(0) on the "0" side increases due to the interference effect of light at the timing of the main pulse. Since no interference effect occurs at the timing of satellite pulses, the number of photon counts does not increase nor decrease significantly. When the send bit value is "0", the peak timing in the photon detector PD(0) for detecting "0" matches the timing of the main pulse. Accordingly, the drive-timing determination section 213 can efficiently detect the main pulse by determining the gate application timings so as to include the peak timing tp(0).

Figure 8:
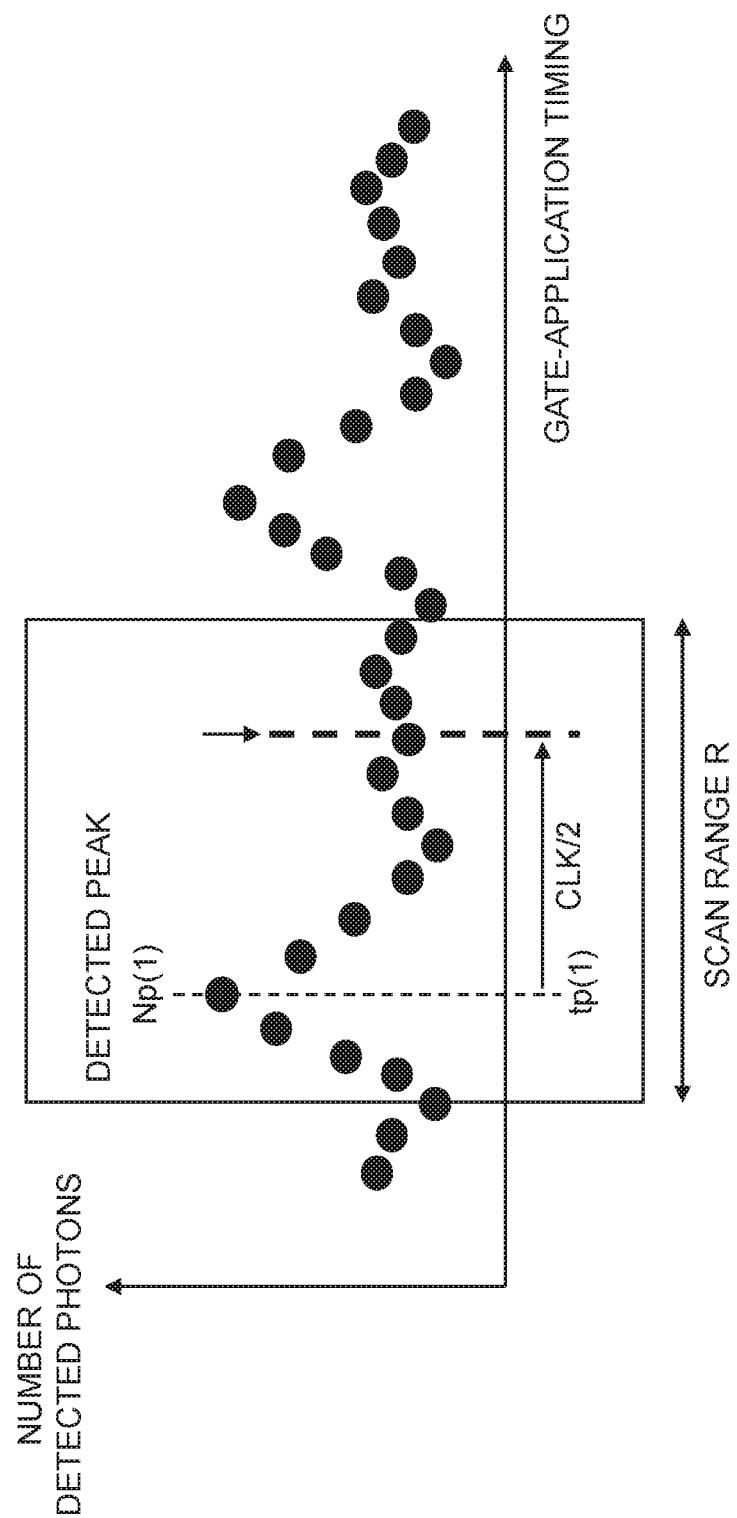
FIG. 8 is a graph showing a change in photon count detected by the photon detector PD on the side of bit value being 1, which is obtained by scanning the gate application timings for the photon detector PD in FIG. 2.

As illustrated in FIG. 8, when scanning the scan range R of the gate application timing corresponding to the clock period CLK, the number of photon counts at the photon detector PD(1) on the "1" side decreases at the timing of the main pulse and peaks at the timing of the satellite pulse. Accordingly, the drive-timing determination section 213 determines the gate application timing so as to include the timing shifted by half a clock (CLK/2) from the peak timing tp(1) as the timing of the satellite pulse. Such setting of the drive timing can achieve efficient detection of the main pulse as in the case of FIG. 7.

1.5) Effects

As described above, according to the exemplary embodiment of the present invention, the send data is fixed to a predetermined bit value, thereby allowing the correct setting of the drive timing of the photon detector only by detecting the peak of photon count. Accordingly, it is possible to adjust the drive timing at high speeds and with high reliability. It is also possible to set the gate application timing in synchronization with the main pulse instead of the unnecessary satellite pulse. In contrast to the method of calculating the error rate to determine the main pulse, the main pulse is determined using only the number of photons, which has advantageous effects of significantly reducing the measurement time and the amount of calculation and of shortening time required to adjust the drive timing.

2. Examples

Hereinafter, a one-way QKD system to which a drive-timing adjustment device according to an example of the present invention is applied will be described.

2.1) Configuration

Figure 9:
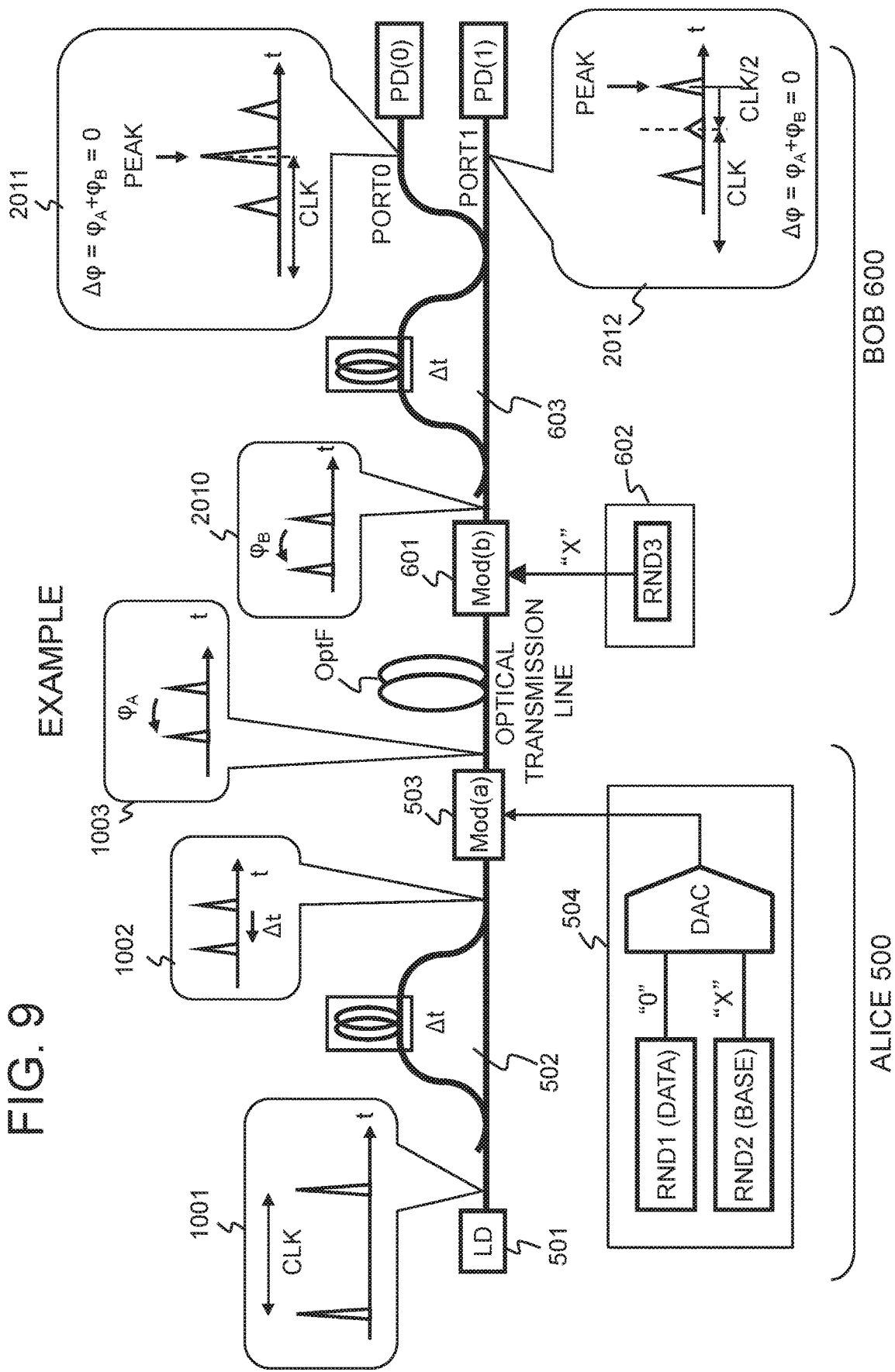
FIG. 9 is a schematic system configuration diagram for explaining a drive-timing setting process in a quantum key distribution (QKD) system according to an example of the present invention.

Referring to FIG. 9, Alice 500 being a sending-side communication device and Bob 600 being a receiving-side communication device are connected through an optical transmission line OptF.

The Alice 500 includes: a pulse light source (laser diode: LD) 501 that generates a photon pulse 1001 having a period of CLK; an asymmetric optical interferometer 502 that splits each photon pulse in time into two consecutive pulses to output a double pulse 1002; a phase modulator 503 that provides a predetermined phase difference φA between the two consecutive pulses of the double pulse 1002; and a random number source 504 that supplies a random number to the phase modulator 503. The asymmetric optical interferometer 502 may employ, for example, a 2-input 2-output asymmetric Mach-Zehnder interferometer. In the Alice 500, an optical attenuator may be provided at the stage of sending photon pulses to the optical transmission line OptF to attenuate the intensity of each photon pulse to one or less photon per pulse.

The random number source 504 has two lines of random number sources RND1 and RND2 and a digital-analog converter (DAC) that combines these random numbers. The random number supplied from the random number source 504 to the phase modulator 503 is generated based on a typical algorithm for quantum cryptographic key distribution called BB84 protocol described later. According to the BB84 protocol, the phase modulator 503 changes each phase of the two consecutive pulses among four values of 0, π/2, π, and 3π/2, and these four values are randomly assigned to each of the two consecutive pulses as will be described later.

Bob 600 includes: a phase modulator 601 that provides a phase difference φB between two consecutive photon pulses received from Alice 500 through the optical transmission line OptF; a random number source 602 that supplies a random number to the phase modulator 601; an asymmetric optical interferometer 603 that combines two consecutive photon pulses modulated by the phase modulator 601; and two gate-mode photon detectors PD(0) and PD(1) which are optically connected respectively to two output ports PORT1 and PORT2 of the asymmetric optical interferometer 603. The random number source 602 has a single random number source RND3. According to the BB84 protocol, the phase modulator 601 performs phase modulation on the two consecutive photon pulses with two values of 0 and π/2 according to a random number from the random number source RND3.

Note that the followings are not shown in FIG. 9 for the sake of simplicity: the processor 104 on the sending side, the processor 204 on the receiving side, the memory 205 and the program memory 206 shown in FIG. 2. Alice 500 and Bob 600 cooperate with each other to perform the encryption key generation process by executing the programs stored in a memory (not shown).

The quantum cryptographic key distribution algorithm normally adopted in the QKD system shown in FIG. 9 will be briefly described below, and then the drive-timing adjustment operation according to the present example will be described.

2.2) Quantum Key Distribution Algorithm

Figure 10:
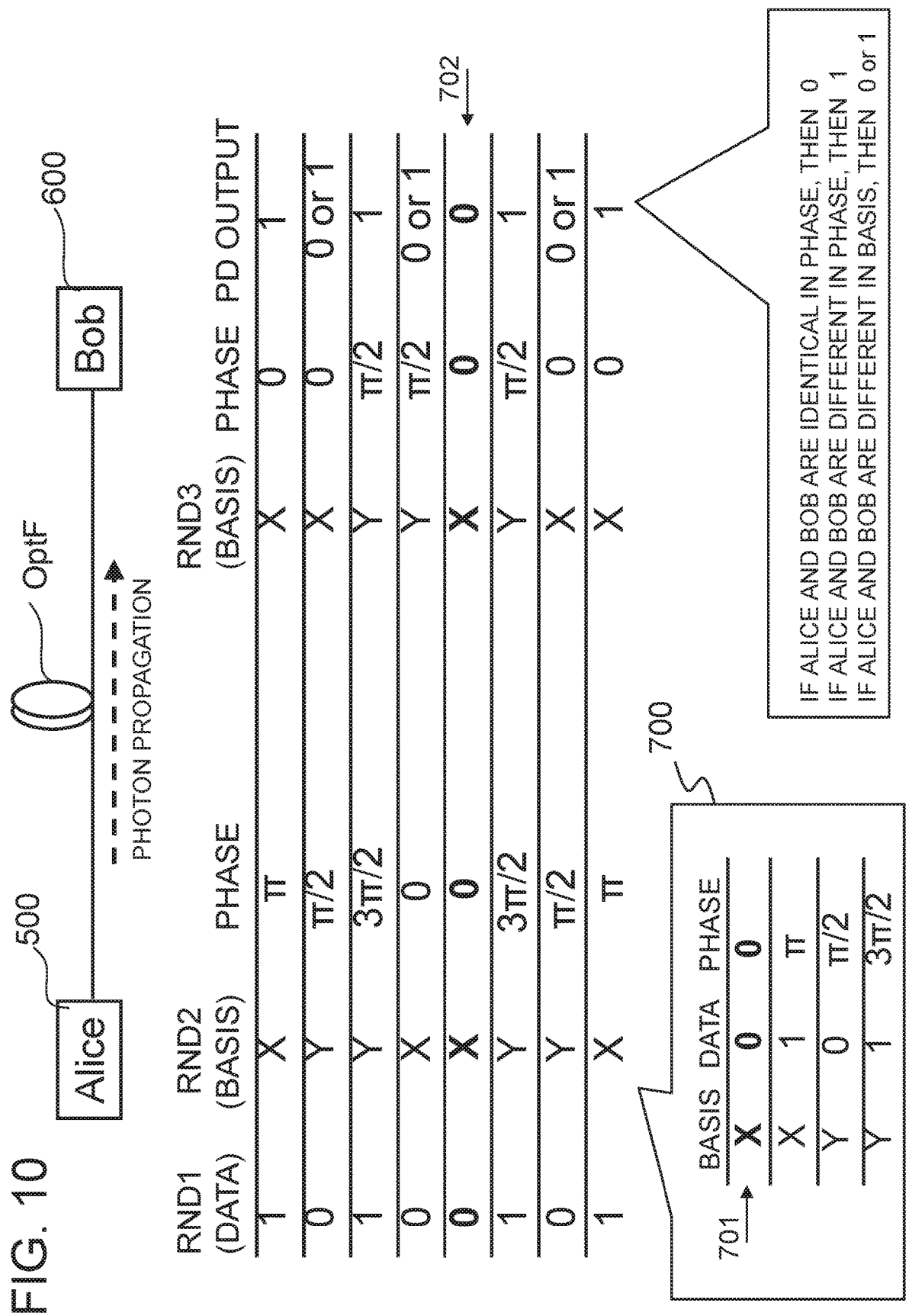
FIG. 10 is an explanatory diagram of a typical BB84 protocol used for quantum cryptographic key distribution in the QKD system shown in FIG. 9. [Exemplary Embodiments of Invention]

FIG. 10 is an explanatory diagram conceptually showing the BB84 protocol. Here, it is assumed that the Alice 500 on the sending side and the Bob 600 on the receiving side are connected through the optical transmission path OptF for quantum cryptography communication. Here, Alice 500 has two random number sources RND1 and RND2 to use four quantum states. RND1 represents encryption key data, and the other RND2 represents a coding way of the data RND1.

Specifically, four-state coding is performed using the phase difference TA between two coherent consecutive pulses. As shown in the table 700 in FIG. 10, either X basis or Y basis is selected according to the random number value of RND2. The X basis is a coding set in which phase 0 represents data "0" and phase π represents data "1". The Y basis is a coding set in which phase π/2 represents data "0" and phase 3π/2 represents an encryption key "1", In other words, Alice 500 randomly performs four types of modulation of 0, π/2, π, and 3π/2 on the two consecutive pulses according to a combination of basis and data. The two consecutive pulses thus modulated are sent to Bob 600.

On the other hand, Bob 600 includes a random number source (RND3) corresponding to basis and decodes two consecutive pulses received from Alice 500. When the value of RND3 is "0", the 0-phase (X basis) modulation is performed on the photon pulses. When the value of RND3 is "1", the π/2-phase (Y basis) modulation is performed on the photon pulses.

When the bases of the modulations performed by both Alice 500 and Bob 600 are the same (RND2 is equal to RND3), Bob 600 can correctly detect the value (data) of RND1 (RND1 is equal to the PD output). When the bases of the modulations performed by both Alice 500 and Bob 600 are different (RND2 is not equal to RND3), the PD output of Bob 600 is 0 or 1 at random regardless of the value (data) of RND1.

Each of RND1, RND2 and RND3 is a random number varying for each bit. Accordingly, the probability that the bases match and the probability that the bases do not match are both 50%. However, since bits whose bases do not match are deleted by basis reconciliation as downstream processing, Alice 500 and Bob 600 can share a 0/1-bit sequence corresponding to RND1.

2.3) Drive-Timing Adjustment

In the QKD system adopting the above-mentioned BB84 protocol, the drive-timing adjustment according to the present example is performed as follow.

As illustrated in FIG. 9, Alice 500 and Bob 600 fix their bases to either X or Y in the drive-timing adjustment stage. Here, both RND2 of Alice 500 and RND3 of Bob 600 are fixed to X="0". As a result, the phase modulator 601 performs modulation to provide a phase difference $\varphi B=\varphi A=0$ to the two consecutive pulses of a double pulse received from Alice 500, and outputs the received double pulse 2010 to the asymmetric interferometer 603.

The two consecutive pulses of the received double photon pulse 2010 interferes with each other by the asymmetric interferometer 603. As shown in FIG. 9, a triple pulse 2011 appears on the "0" value port PORT0 of the asymmetric interferometer 603 and a triple pulse 2012 appears on the "1" value port PORT1. The triple pulse 2011 on the "0" value port PORT0 is detected by the photon detector PD(0), and the triple pulse 2012 on the "1" value port PORT1 is detected by the photon detector PD(1).

In this way, the matching bases between Alice 500 and Bob 600 and the send data fixed to "0" causes the photon detector PD(0) or PD(1) to detect photons as indicated by the arrow 702 in FIG. 10. As described above, the numbers of detected photons are recorded in the memory 205 while scanning the predetermined scan range R of the gate application timing. Gate application timings for driving the photon detectors PD(0) and PD(1) are determined from the timing tp(0) indicating the peak value of the photon counts.

2.4) Effect

As described above, according to the example of the present invention, the bases of Alice 500 and Bob 600 are made identical and the send data is fixed to "0", whereby the drive timing of the photon detectors can be correctly set only by detecting the peak of the photon counts, allowing high-speed and highly reliable drive-timing adjustment.

Further, the drive timing can be correctly adjusted in the drive-timing adjustment phase in the QKD system, resulting in efficient and highly reliable quantum key distribution.

3. Supplementary Notes

Part or all of the above-described illustrative exemplary embodiments and examples can also be described as, but are not limited to, the following additional statements.

Supplementary Note 1

A drive-timing adjustment device for a photon detector of a receiver in an optical communication system in which information is transmitted from a sender to the receiver by phase-modulation on photon pulses according to the information, the device comprising:

an asymmetric interferometer that inputs an optical pulse sequence from the sender and outputs an interference output optical pulse to the photon detector, wherein the optical pulse sequence includes two consecutive pulses, the sender subjecting the two consecutive pulses to phase-modulation according to send data fixed to a predetermined bit value, wherein the interference output optical pulse is generated by the two consecutive pulses interfering with each other depending on a phase difference, and wherein the interference output optical pulse is output to the photon detector corresponding to the phase difference; and a controller configured to: record photon counts of photons detected by the photon detector while shifting gate application timing for the photon detector over a predetermined range; and set gate application timing for the photon detector with reference to a timing indicating a peak value of the photon counts.

Supplementary Note 2

The drive-timing adjustment device according to supplementary note 1, wherein
the asymmetric interferometer outputs the interference output optical pulse to a first photon detector when the predetermined bit value is a first value, and to a second photon detector when the predetermined bit value is a second value;
the controller configured to:
set the gate application timing for the first photon detector to a timing indicating a peak value of photon counts of photons detected by the first photon detector when the predetermined bit value is fixed to the first value, and
set the gate application timing for the second photon detector to a timing indicating a peak value of photon counts of photons detected by the second photon detector when the predetermined bit value is fixed to the second value.

Supplementary Note 3

The drive-timing adjustment device according to supplementary note 1, wherein
the asymmetric interferometer outputs the interference output optical pulse to a first photon detector when the predetermined bit value is a first value, and to a second photon detector when the predetermined bit value is a second value;
the controller configured to:
set the gate application timing for the second photon detector to a timing deviated by half a clock from a timing indicating a peak value of photon counts of photons detected by the second photon detector when the predetermined bit value is fixed to the first value, and
set the gate application timing for the first photon detector to a timing deviated by half a clock from a timing indicating a peak value of photon counts of photons detected by the first photon detector when the predetermined bit value is fixed to the second value.

Supplementary Note 4

A drive-timing adjustment method for a photon detector of a receiver in an optical communication system in which information is transmitted from a sender to the receiver by phase-modulation on photon pulses according to the information, the method comprising:

at the sender, sending an optical pulse sequence comprising two consecutive pulses subjected to phase-modulation according to send data fixed to a predetermined bit value;

at the receiver, by an asymmetric interferometer, outputting an interference output optical pulse to the photon detector, wherein the interference output optical pulse is generated by the two consecutive pulses interfering with each other depending on a phase difference, and wherein the interference output optical pulse is output to the photon detector corresponding to the phase difference; and by a controller, recording photon counts of photons detected by the photon detector while shifting gate application timing for the photon detector over a predetermined range, and setting gate application timing for the photon detector with reference to a timing indicating a peak value of the photon counts.

Supplementary Note 5

The drive-timing adjustment method according to supplementary note 4, wherein the asymmetric interferometer outputs the interference output optical pulse to a first photon detector when the predetermined bit value is a first value, and to a second photon detector when the predetermined bit value is a second value;

the controller configured to: set the gate application timing for the first photon detector to a timing indicating a peak value of photon counts of photons detected by the first photon detector when the predetermined bit value is fixed to the first value; and set the gate application timing for the second photon detector to a timing indicating a peak value of photon counts of photons detected by the second photon detector when the predetermined bit value is fixed to the second value.

Supplementary Note 6

The drive-timing adjustment method according to supplementary note 4, wherein the asymmetric interferometer outputs the interference output optical pulse to a first photon detector when the predetermined bit value is a first value, and to a second photon detector when the predetermined bit value is a second value;

the controller configured to; set the gate application timing for the second photon detector to a timing deviated by half a clock from a timing indicating a peak value of photon counts of photons detected by the second photon detector when the predetermined bit value is fixed to the first value; and set the gate application timing for the first photon detector to a timing deviated by half a clock from a timing indicating a peak value of photon counts of photons detected by the first photon detector when the predetermined bit value is fixed to the second value.

Supplementary Note 7

An optical communication system in which a sender and a receiver are connected through an optical transmission line, the sender comprising:

a light source that generates pulses having a predetermined period;

a first asymmetric interferometer having a predetermined delay time; and a phase modulator that performs phase-modulation on two consecutive pulses of a double pulse inputted from the first asymmetric interferometer according to send data fixed to a predetermined bit value, the receiver comprising:

a plurality of photon detectors each corresponding to bit values of the send data;

a second asymmetric interferometer having the predetermined delay time, wherein the second asymmetric interferometer receives a double pulse from the sender and outputs an interference output optical pulse to a photon detector, wherein the interference output optical pulse is generated by two consecutive pulses of the received double pulse interfering with each other depending on a phase difference, and wherein the interference output optical pulse is output to the photon detector corresponding to the phase difference; and a controller configured to: record photon counts of photons detected by the photon detector while shifting gate application timing for the photon detector over a predetermined range; and set gate application timing for the photon detector with reference to a timing indicating a peak value of the photon counts.

Supplementary Note 8

A program functioning a computer as an adjustment device for adjusting drive timing of a photon detector of a receiver in an optical communication system in which information is transmitted from a sender to the receiver by phase-modulation on photon pulses according to the information, the adjustment device comprising an asymmetric interferometer that receives an optical pulse sequence from the sender and outputs an interference output optical pulse to the photon detector, wherein the optical pulse sequence includes two consecutive pulses, the sender subjecting the two consecutive pulses to phase-modulation according to send data fixed to a predetermined bit value, wherein the interference output optical pulse is generated by the two consecutive pulses interfering with each other depending on a phase difference, and wherein the interference output optical pulse is output to the photon detector corresponding to the phase difference, the program comprising:

a first function of recording photon counts of photons detected by the photon detector while shifting gate application timing for the photon detector over a predetermined range; and a second function of setting gate application timing for the photon detector with reference to a timing indicating a peak value of the photon counts.

Supplementary Note 9

The program according to supplementary note 8, wherein the asymmetric interferometer outputs the interference output optical pulse to a first photon detector when the predetermined bit value is a first value, and to a second photon detector when the predetermined bit value is a second value;

the second function comprises functions of:
setting the gate application timing for the first photon detector to a timing indicating a peak value of photon counts of photons detected by the first photon detector when the predetermined bit value is fixed to the first value, and
setting the gate application timing for the second photon detector to a timing indicating a peak value of photon counts of photons detected by the second photon detector when the predetermined bit value is fixed to the second value.

Supplementary Note 10

The program according to supplementary note 8, wherein the asymmetric interferometer outputs the interference output optical pulse to a first photon detector when the predetermined bit value is a first value, and to a second photon detector when the predetermined bit value is a second value;
the second function comprises functions of:
setting the gate application timing for the second photon detector to a timing deviated by half a clock from a timing indicating a peak value of photon counts of photons detected by the second photon detector when the predetermined bit value is fixed to the first value, and
setting the gate application timing for the first photon detector to a timing deviated by half a clock from a timing indicating a peak value of photon counts of photons detected by the first photon detector when the predetermined bit value is fixed to the second value.

Supplementary Note 11

An optical communication device comprising the drive-timing adjustment device according to any of supplementary notes 1-3.

Supplementary Note 12

A receiver of a quantum key distribution (QKD) system, comprising the drive-timing adjustment device according to any of supplementary notes 1-3.

INDUSTRIAL APPLICABILITY

The present invention can be applied to a one-way QKD system including asymmetrical interferometers.

REFERENCE SIGNS LIST

100 Sender (Alice)
101 Laser light source
102 Asymmetrical interferometer
103 Phase modulator
105 Processor
200 Receiver (Bob)
201 Asymmetrical interferometer
202 Photon detecting unit
203 Gate application circuit
204 Processor
205 Memory
206 Program memory
210 Gate application timing controller
211 Peak extractor
212 Photon counter
213 Controller
PD(0) Photon detector on bit "0" side
PD(1) Photon detector on bit "1" side
500 Sender (Alice)
501 Laser light source
502 Asymmetric interferometer
503 Phase modulator
504 Random number generator
600 Receiver (Bob)
601 Phase modulator
602 Random number generator
603 Asymmetric interferometer

The invention claimed is:
1. A drive-timing adjustment device for a photon detector of a receiver in an optical communication system in which information is transmitted from a sender to the receiver by phase-modulation on photon pulses according to the information, the device comprising:
an asymmetric interferometer that inputs an optical pulse sequence from the sender and outputs an interference output optical pulse to the photon detector, wherein the optical pulse sequence includes double pulses each consisting of two consecutive pulses, the sender subjecting the double pulses to phase-modulation by generating a predetermined phase difference between the two consecutive pulses according to a send bit value of send data whose bit value is fixed to a certain one of predetermined bit values, wherein the interference output optical pulse is generated by the two consecutive pulses phase-modulated interfering with each other depending on the predetermined phase difference, and wherein the interference output optical pulse is output to the photon detector corresponding to the predetermined phase difference; and
a controller configured to: record photon counts of photons detected by the photon detector while shifting gate application timing for the photon detector over a predetermined range; and set gate application timing for the photon detector with reference to a timing indicating a peak value of the photon counts.
2. The drive-timing adjustment device according to claim 1, wherein
the asymmetric interferometer outputs the interference output optical pulse to a first photon detector when the certain one of the predetermined bit values is a first value, and to a second photon detector when the certain one of the predetermined bit values is a second value;
the controller configured to:
set the gate application timing for the first photon detector to a timing indicating a peak value of photon counts of photons detected by the first photon detector when the certain one of the predetermined bit values is the first value, and
set the gate application timing for the second photon detector to a timing indicating a peak value of photon counts of photons detected by the second photon detector when the certain one of the predetermined bit values is the second value.
3. The drive-timing adjustment device according to claim 1, wherein
the asymmetric interferometer outputs the interference output optical pulse to a first photon detector when the certain one of the predetermined bit values is a first value, and to a second photon detector when the certain one of the predetermined bit values is a second value;
the controller configured to:
set the gate application timing for the second photon detector to a timing deviated by half a clock from a timing indicating a peak value of photon counts of photons detected by the second photon detector when the certain one of the predetermined bit values is the first value, and
set the gate application timing for the first photon detector to a timing deviated by half a clock from a timing indicating a peak value of photon counts of photons detected by the first photon detector when the certain one of the predetermined bit values is the second value.

4. An optical communication device comprising the drive-timing adjustment device according to claim 1.

5. A receiver of a quantum key distribution (QKD) system, comprising the drive-timing adjustment device according to claim 1.

6. The drive-timing adjustment device according to claim 1, wherein the predetermined bit values are 0 and 1, wherein the certain one of the predetermined bit values is 0 or 1.

7. A drive-timing adjustment method for a photon detector of a receiver in an optical communication system in which information is transmitted from a sender to the receiver by phase-modulation on photon pulses according to the information, the method comprising:
sending at the sender, an optical pulse sequence including double pulses each consisting of two consecutive pulses subjected to phase-modulation by generating a predetermined phase difference between the two consecutive pulses according to a send bit value of send data whose bit value is fixed to a certain one of predetermined bit values;
outputting at the receiver, by an asymmetric interferometer, an interference output optical pulse to the photon detector, wherein the interference output optical pulse is generated by the two consecutive pulses phase-modulated interfering with each other depending on the predetermined phase difference, and wherein the interference output optical pulse is output to the photon detector corresponding to the predetermined phase difference; and
recording, by a controller, photon counts of photons detected by the photon detector while shifting gate application timing for the photon detector over a predetermined range, and setting gate application timing for the photon detector with reference to a timing indicating a peak value of the photon counts.

8. The drive-timing adjustment method according to claim 7, further comprising:
outputting by the asymmetric interferometer the interference output optical pulse to a first photon detector when the certain one of the predetermined bit values is a first value, and to a second photon detector when the certain one of the predetermined bit values is a second value;
setting by the controller the gate application timing for the first photon detector to a timing indicating a peak value of photon counts of photons detected by the first photon detector when the certain one of the predetermined bit values is the first value; and
setting by the controller the gate application timing for the second photon detector to a timing indicating a peak value of photon counts of photons detected by the second photon detector when the certain one of the predetermined bit values is the second value.

9. The drive-timing adjustment method according to claim 7, further comprising:
outputting by the asymmetric interferometer the interference output optical pulse to a first photon detector when the certain one of the predetermined bit values is a first value, and to a second photon detector when the certain one of the predetermined bit values is a second value;
setting by the controller the gate application timing for the second photon detector to a timing deviated by half a clock from a timing indicating a peak value of photon counts of photons detected by the second photon detector when the certain one of the predetermined bit values is the first value; and
setting by the controller the gate application timing for the first photon detector to a timing deviated by half a clock from a timing indicating a peak value of photon counts of photons detected by the first photon detector when the certain one of the predetermined bit values is the second value.

10. The drive-timing adjustment method according to claim 7, wherein the predetermined bit values are 0 and 1, wherein the certain one of the predetermined bit values is 0 or 1.

11. A non-transitory computer readable information storage medium storing a program that functions a computer as an adjustment device for adjusting drive timing of a photon detector of a receiver in an optical communication system in which information is transmitted from a sender to the receiver by phase-modulation on photon pulses according to the information, the adjustment device comprising an asymmetric interferometer that receives an optical pulse sequence from the sender and outputs an interference output optical pulse to the photon detector, wherein the optical pulse sequence includes double pulses each consisting of two consecutive pulses, the sender subjecting the double pulses to phase-modulation by generating a predetermined phase difference between the two consecutive pulses according to a send bit value of send data whose bit value is fixed to a certain one of predetermined bit values, wherein the interference output optical pulse is generated by the two consecutive pulses phase-modulated interfering with each other depending on the predetermined phase difference, and wherein the interference output optical pulse is output to the photon detector corresponding to the predetermined phase difference, the program which, when executed by a processor, performs a method comprising:
a) recording photon counts of photons detected by the photon detector while shifting gate application timing for the photon detector over a predetermined range; and
b) setting gate application timing for the photon detector with reference to a timing indicating a peak value of the photon counts.

12. The non-transitory computer readable storage medium according to claim 11, wherein
the asymmetric interferometer outputs the interference output optical pulse to a first photon detector when the certain one of the predetermined bit values is a first value, and to a second photon detector when the certain one of predetermined bit values is a second value;
the b) further comprising:
setting the gate application timing for the first photon detector to a timing indicating a peak value of photon counts of photons detected by the first photon detector when the certain one of the predetermined bit values is the first value, and
setting the gate application timing for the second photon detector to a timing indicating a peak value of photon counts of photons detected by the second photon detector when the certain one of the predetermined bit values is the second value.

13. The non-transitory computer readable storage medium according to claim 11, wherein
the asymmetric interferometer outputs the interference output optical pulse to a first photon detector when the certain one of the predetermined bit values is a first value, and to a second photon detector when the certain one of the predetermined bit values is a second value;
the b) further comprising:
setting the gate application timing for the second photon detector to a timing deviated by half a clock from a timing indicating a peak value of photon counts of photons detected by the second photon detector when the certain one of the predetermined bit values is the first value, and
setting the gate application timing for the first photon detector to a timing deviated by half a clock from a timing indicating a peak value of photon counts of photons detected by the first photon detector when the certain one of the predetermined bit values is the second value.

14. The non-transitory computer readable storage medium according to claim 11, wherein the predetermined bit values are 0 and 1, wherein the certain one of the predetermined bit values is 0 or 1.

\* \* \* \* \*